US008665062B2

(12) United States Patent
Bragagnini et al.

(10) Patent No.: US 8,665,062 B2
(45) Date of Patent: Mar. 4, 2014

(54) METHOD AND SYSTEM FOR COMMUNICATING ACCESS AUTHORIZATION REQUESTS BASED ON USER PERSONAL IDENTIFICATION AS WELL AS METHOD AND SYSTEM FOR DETERMINING ACCESS AUTHORIZATIONS

(75) Inventors: Andrea Bragagnini, Turin (IT); Sara Della Luna, Stroncone (IT); Stefano Nocentini, Rome (IT); Maria Santina Turolla, Turin (IT)

(73) Assignee: Telecom Italia S.p.A., Milan (IT)

( * ) Notice: Subject to any disclaimer, the term of this patent is extended or adjusted under 35 U.S.C. 154(b) by 237 days.

(21) Appl. No.: 13/002,019

(22) PCT Filed: Jun. 30, 2008

(86) PCT No.: PCT/EP2008/005326
§ 371 (c)(1),
(2), (4) Date: Dec. 29, 2010

(87) PCT Pub. No.: WO2010/000276
PCT Pub. Date: Jan. 7, 2010

(65) Prior Publication Data

US 2011/0109431 A1 May 12, 2011

(51) Int. Cl.

| | |
|---|---|
| ***G05B 19/00*** | (2006.01) |
| ***G05B 23/00*** | (2006.01) |
| ***G06F 7/00*** | (2006.01) |
| ***G06F 7/04*** | (2006.01) |
| ***G06K 19/00*** | (2006.01) |
| ***G08B 29/00*** | (2006.01) |
| ***G08C 19/00*** | (2006.01) |
| ***H04B 1/00*** | (2006.01) |
| ***H04B 3/00*** | (2006.01) |
| ***H04Q 1/00*** | (2006.01) |
| ***H04Q 9/00*** | (2006.01) |

(52) U.S. Cl.
USPC ......... 340/5.52; 340/5.3; 340/5.53; 340/5.61; 340/5.7; 340/10.1; 235/382; 382/124

(58) Field of Classification Search
USPC ............... 340/5.52, 5.3, 5.61, 5.7, 10.1, 5.53; 235/382; 382/124
See application file for complete search history.

(56) References Cited

U.S. PATENT DOCUMENTS 5,705,991 A * 1/1998 Kniffin et al. ................ 340/5.28
6,104,922 A 8/2000 Baumann (Continued)

FOREIGN PATENT DOCUMENTS

CA 2183886 9/1995
DE 103 39 476 B3 5/2005

(Continued)

OTHER PUBLICATIONS

International Search Report from the European Patent Office for International Application No. PCT/EP2008/005326 (Mail date Apr. 14, 2009).

*Primary Examiner* — Benjamin C Lee
*Assistant Examiner* — Quang D Pham
(74) *Attorney, Agent, or Firm* — Finnegan, Henderson, Farabow, Garrett & Dunner, L.L.P.

(57) ABSTRACT

A control system for access to a limited access area requires identification and preferably authentication of the accessing person; in order to achieve efficiency and effectiveness, the system need to be automatic. According to the present invention, the arrangement associated with the accessing person is split into at least two devices in communication between each other: a personal identity biometric authentication device (D1) and a wirelessly communicating device (D2); the authentication device (D1) is responsible for user authentication, while the communication device (D2) is responsible for transmitting requests of access authorization to an electronic access controller (D3).

10 Claims, 4 Drawing Sheets

(56) References Cited

U.S. PATENT DOCUMENTS

| | | | | |
|---|---|---|---|---|
| 6,703,918 | B1 * | 3/2004 | Kita | 340/5.52 |
| 6,710,700 | B1 * | 3/2004 | Tatsukawa et al. | 340/5.53 |
| 6,850,147 | B2 * | 2/2005 | Prokoski et al. | 340/5.53 |
| 7,362,210 | B2 * | 4/2008 | Bazakos et al. | 340/5.53 |
| 7,378,939 | B2 * | 5/2008 | Sengupta et al. | 340/5.64 |
| 8,232,862 | B2 * | 7/2012 | Lowe | 340/5.53 |
| 2002/0060243 | A1 * | 5/2002 | Janiak et al. | 235/382 |
| 2002/0066041 | A1 * | 5/2002 | Lemke | 713/202 |
| 2002/0095608 | A1 * | 7/2002 | Slevin | 713/202 |
| 2002/0140542 | A1 * | 10/2002 | Prokoski et al. | 340/5.52 |
| 2003/0115490 | A1 * | 6/2003 | Russo et al. | 713/202 |
| 2003/0189480 | A1 | 10/2003 | Hamid | |
| 2004/0062133 | A1 * | 4/2004 | Tsuji | 365/232 |
| 2004/0257196 | A1 * | 12/2004 | Kotzin | 340/5.52 |
| 2005/0046545 | A1 | 3/2005 | Skekloff et al. | |
| 2005/0226468 | A1 * | 10/2005 | Deshpande et al. | 382/115 |
| 2005/0250472 | A1 * | 11/2005 | Silvester et al. | 455/411 |
| 2006/0049922 | A1 | 3/2006 | Kolpasky et al. | |
| 2006/0219776 | A1 | 10/2006 | Finn | |
| 2006/0236373 | A1 * | 10/2006 | Graves et al. | 726/3 |
| 2006/0294359 | A1 * | 12/2006 | Chou et al. | 713/2 |
| 2007/0057763 | A1 * | 3/2007 | Blattner et al. | 340/5.52 |
| 2007/0213096 | A1 * | 9/2007 | Bella et al. | 455/558 |
| 2008/0080750 | A1 * | 4/2008 | Bee et al. | 382/124 |
| 2008/0175449 | A1 * | 7/2008 | Fang et al. | 382/124 |
| 2008/0229409 | A1 * | 9/2008 | Miller et al. | 726/19 |
| 2008/0260211 | A1 * | 10/2008 | Bennett et al. | 382/115 |
| 2008/0261560 | A1 * | 10/2008 | Ruckart | 455/411 |
| 2009/0164798 | A1 * | 6/2009 | Gupta | 713/186 |
| 2009/0201128 | A1 * | 8/2009 | Campisi | 340/5.53 |
| 2009/0237203 | A1 * | 9/2009 | Determan et al. | 340/5.52 |
| 2009/0320538 | A1 * | 12/2009 | Pellaton | 70/278.1 |
| 2010/0049987 | A1 * | 2/2010 | Ettorre et al. | 713/186 |
| 2012/0253607 | A1 * | 10/2012 | Choi | 701/49 |

FOREIGN PATENT DOCUMENTS

| | | | | |
|---|---|---|---|---|
| EP | 1 249 794 | A1 | 10/2002 | |
| EP | 1 876 570 | A1 | 1/2008 | |
| FR | 2 870 035 | | 11/2005 | |
| GB | 2 421 623 | A | 6/2006 | |
| WO | WO-95/14982 | | 6/1995 | |
| WO | WO-02/32045 | A1 | 4/2002 | |
| WO | WO-2007/106875 | A2 | 9/2007 | |
| WO | WO-2008/074342 | A1 | 6/2008 | |
| WO | WO 2008074342 | A1 * | 6/2008 | H04L 29/06 |

* cited by examiner

METHOD AND SYSTEM FOR COMMUNICATING ACCESS AUTHORIZATION REQUESTS BASED ON USER PERSONAL IDENTIFICATION AS WELL AS METHOD AND SYSTEM FOR DETERMINING ACCESS AUTHORIZATIONS

CROSS REFERENCE TO RELATED APPLICATION

This application is a national phase application based on PCT/EP2008/005326, filed on Jun. 30, 2008.

1. Field of the Invention

The present invention relates to a method and system for communicating access authorization requests based on user personal identification as well as to a method and system for determining access authorizations.

2. Background of the Invention

Since a very long time, personal identification and authentication of individuals has been important; let us think for example to the use of identity cards and passports for normal individuals and the registration of fingerprints for criminals.

In the present day, the need for automatic personal identification and authentication of individuals in every sphere of life is fast coming into prominence and already various forms of automatic personal authentication in variety of applications requiring such personal authentication has been developed and made available to meet such application specific securities/utilities.

The above need for automatic evaluation of identity of individuals has led to development of variety of methods including biometric recognition of individuals; biometric characteristics can be divided in two main classes: physiological and behavioural; physiological characteristics are related to the shape of the body of a person such as fingerprints (probably the mostly widespread), face, hand and iris; behavioural characteristics are related to the behaviour of a person such as voice (probably the mostly widespread) and signature.

U.S. Pat. No. 6,104,922 is directed to a method and apparatus for authenticating subscribers units and users in a communications system which includes a communication node adapted to receive biometric information describing a user and measures an RF signature of the subscriber unit. The biometric information and RF signature are compared against a valid user profile to determine authenticity of the user and the subscriber unit. Basically this prior art is thus directed to a way for authentication of a mobile phone, to the mobile network based on detected biometric data and to the check against the template in a network device.

CA2183886 is directed to a personal biometric authentication system which can be used for controlling access to equipment or physical facilities.

Access control is indeed a technical field where personal identification and authentication finds application.

Also in the field of traffic control, identification and authentication is important; in fact, since a long time, vehicles are provided with plates. Recently, electronic plates have been proposed for vehicles; for example, FR2870035 deals with such a solution.

Electronic detection and identification of vehicles is known for example from EP1249794, EP1876570 and WO9514982 for toll collection.

Traffic control systems are one of the most vital aspects of proper and effective public administrations in governing and controlling cities. Sizes and amount of cars are increasing and this causes mobility problems like congested roads, lack of parking area and so on. Thus there's an increasing demand for automatic systems that accomplish various tasks like speed control, city access control, parking access and payment, road toll payment and so on. Nowadays solutions to these problems are normally based on manual operation and/or inspection.

According to WO2008/074342 of the present Applicant, an arrangement for secure user authentication comprises a computer or telecommunication terminal with a smartcard and a device; the smartcard is adapted to securely store biometric information relating to at least one user and the device is adapted to detect biometric data of users; the smartcard and the device comprise a radio interface for communicating together and a module for exchanging biometric information between each other.

SUMMARY OF THE INVENTION

From the above prior art, the Applicant has made the consideration that personal identification and authentication, including the biometric methods, presently proposed are mostly application specific since the biometric information involved in the authentication process need to be generated and utilized within the system requiring authentication so the biometric information under use for an authentication purpose is secured to the extent possible in the given environment of its use and application.

The above consideration applies also to the solution according to WO2008/074342; in fact, this solution provides for two entities separate and communicating between each other: a biometric detecting device and a computer or telephone terminal which is the entity to be accessed after successful authentication by means of the biometric detecting device.

This means that flexibility of such known automatic personal authentication systems may be improved.

The Applicant has also made the consideration that the few known automatic vehicle identification/authentication systems, usually based on electronic plates, basically helps in identifying only the vehicle carrying a specific electronic plate, while there is no information about the current users/occupants of the vehicle, in particular its driver.

Knowledge of the current user/occupant of a car may be relevant in some applications, like, for instance, access control to limited traffic area. Limited traffic area policies may be based on the characteristics of the vehicle, like for instance gas emission, and/or to the "characteristics" of the occupants; in many limited traffic city zones, there are some special rules for "special" people like, for instance, people with physical limitations and diseases or doctors that have to visit patients that live in the limited traffic city zone. Access for this "special" people has to be granted based on their identity and not on the vehicle identity they are currently using; in fact, the vehicle may change since they may have more than one car or they may travel aboard the car of someone else.

Nowadays, there is no automatic solution to this problem and only manual operation and/or inspection is possible. For example, the identity of this "special" person is certified using certificates that have to be shown on the windshield or using special plates. This approach has some limitations: if the certificate is tied to the vehicle, it can be used only on that one (lack of flexibility); if it is not, frauds are possible since the certificate can be used by a person different from the holder of the certificate. Furthermore, a manual check is less effective and efficient than an automatic check.

This means that flexibility, effectiveness and efficiency of such known automatic vehicle authentication systems may be improved.

The invention herein described addresses the general problem of personal identification and authentication for access control and aims at a solution which would be electronic, safe and flexible.

In particular, the invention herein described addresses the problem of personal identification of individuals onboard a vehicle for access control of the vehicle and aims at a solution which would be effective and efficient in addition to being safe and flexible.

The basic idea behind the present invention is to split an arrangement associated with the person to be authenticated into at least two devices in communication between each other: a personal identity authentication device and a wirelessly communicating device; the personal identity authentication device is a device responsible for biometric user authentication, while the communication device is a device responsible for transmitting requests of access authorization to a limited access area; the personal identity authentication device may integrate or be associated with a biometric detecting device that is a device responsible for detecting biometric data of users.

According to a basic aspect of the present invention, a method for communicating a request for authorization of access to a limited access area based on user identification involves (a) carrying out a biometric identification of an user through a personal identity authentication device, using such identified biometric information by (b) transferring and storing the same as a request for authorization in a wirelessly communicating device and (c) accessing of the said stored request for authorization by an electronically access controller to authorise access in a limited access area.

In the above method for communicating a request for authorization, it is important to remove the recorded authenticated request of the user after the request is considered by the access controller so that there is no misuse by way of unauthorised multiple access based on requests previously stored in the wirelessly communicating device.

According to a further aspect, the invention provides a method for determining an authorization of access to a limited access area based on user identification and request communication as above by receiving the request for access authorization and processing it based on the contained identity information by means of an electronic controller.

The above electronic personal identification and authentication of a registered user can be stored in one or more electronic device(s).

Thus in the above method, the user biometric authentication by biometric identity detection and comparison can be done in a single device providing both for the detection of the individual biometric identity and its comparison with a pre-stored template of the registered user or by way of detection of the individual biometric identity in a device and comparing the same with a pre-stored biometric template of the registered user in a separate device; even more in general, detection of current biometric data, storage of template biometric data and comparison of current data with reference data may occur in three distinct devices.

The transfer and storage of the biometric identity in the wirelessly communicating device can be through wired or wireless communication technology while the communication between the wirelessly communicating device and the electronic access controller is carried out through wireless technology such as Bluetooth, ZigBee and the like, but preferably ZigBee which is very reliable and safe.

According to one preferred aspect, the above method of the invention can be provided to secure the limited access of vehicles based on the biometric personal identity of the users/occupants in the vehicle; such vehicles should be fitted with a wirelessly communicating device such as an electronic tag/plate. In such a case, one or more of the users/occupants in the vehicle, as per the access requirement, are required to be subject to biometric identification by first recording the biometric identity in a device and then comparing the same with a pre-stored template of the respective user/occupant in order to confirm the presence of the authorised person as an user/occupant in the vehicle. Once this is done,. the request for access is next stored in a wirelessly communicating device which can be the vehicle electronic plate/tag and can be accessed by the electronic access controller controlling the access of the vehicle with authorised occupant/user at limited traffic areas.

The above vehicle occupant's biometric identification based access could thus serve different functionalities including:

(i) recognizing people identity by means of biometric methods (like for example fingerprint recognition and/or voice print recognition);

(ii) storing in a secure way sensitive user data, including the biometric template; and (iii) communicating the user presence on board to electronic control devices, like access control gates.

According to a yet further aspect, the present invention is further directed to a system for communicating requests for authorisation of access to a limited access area comprising a wirelessly communicating device adapted to communicate with an electronic access controller for access authorisation wherein a personal identity authentication device provides for the biometric personal authentication and presence of the user and a wirelessly communicating device is adapted to store such authenticated personal identity of the user as a request for access authorization.

For determining the authorisation of the access based on the request stored in the wirelessly communicating device the latter is adapted to communicate with an electronic access controller to determine the access.

In accordance with the preferred aspect of the invention the system for communicating requests for authorisation of access to a limited access area can be provisioned in vehicles for authorised access of vehicles in limited traffic area based on occupants/user of the vehicle apart from the identity of the vehicle. For such purpose the vehicle is required to carry an electronic tag/plate which can be communicative with the biometric authentication device for recording the request for authorization and also wirelessly communicative with an access controller to allow the vehicle based on the authorization information involving the biometric identity with or without the vehicle identification. The biometric authentication device can have an integrated biometric detection device or an external biometric detection device.

The personal identity authentication device, according to an aspect of the invention, can include a mobile telephone terminal adapted to store (directly or indirectly, i.e. through the associate subscriber identification module) the biometric identity template of the user and communicating with the electronic plate in the vehicle and/or biometric detecting device such as a fingerprint device to favour the determination of authorization access based on personal biometric identification with or without vehicle identification information.

BRIEF DESCRIPTION OF THE DRAWINGS

The present invention will become more apparent from the following description to be considered in conjunction with the annexed drawing, wherein.

It is to be understood that the following description and the annexed drawings are not to be interpreted as limitations of the present invention but simply as exemplifications.

DETAILED DESCRIPTION OF THE INVENTION

Figure 1:
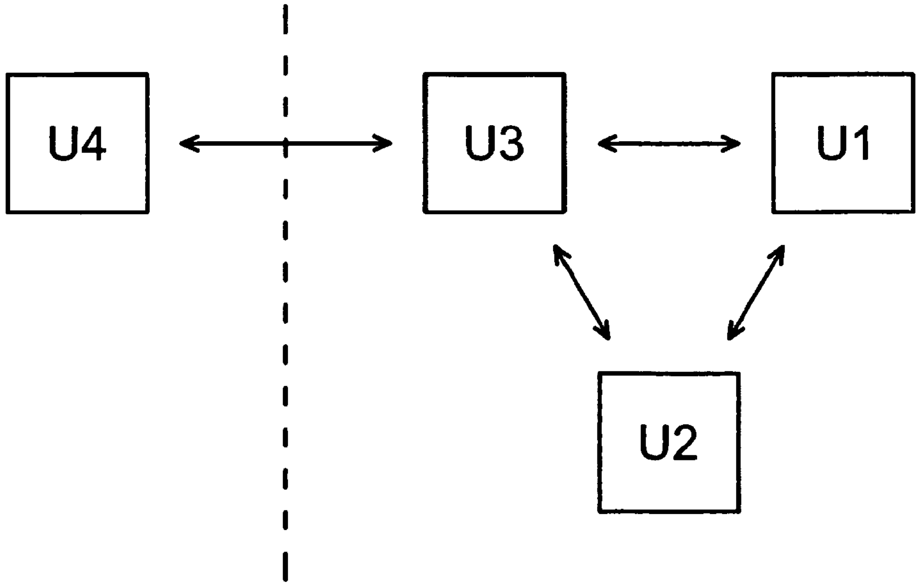
FIG. 1 shows the logical architecture of a system for determining authorizations of access to a limited access area according to the present invention.

The method and system of communicating a request for authorization of access to a limited access area by authenticating personal identity of the user of the present invention is basically built around three logical entities that interact with each other as shown in FIG. 1: a biometric template storage unit U1, a biometric detection unit U2 and a user presence repository unit U3. The biometric template storage unit U1 is used to store the biometric template used to authenticate the user, in particular when he is present on board a vehicle; this can be for instance the fingerprint template of the user. This unit U1 is proper to the user, and the template is stored in a non-volatile memory in such a way that it cannot be modified by the user, but only by authorized people. The biometric detection unit U2 is used to provide a way to the user to identify himself; it can be for instance a fingerprint detection device. The user presence repository unit U3 is used to store the information that a registered user is present and is willing to access a limited access area. Unit U3 is basically a wirelessly communicating device and is responsible to communicate this information to an external electronic control device or access controller. The method and system of determining authorizations of access to a limited access area of the present invention makes of a further entity, namely an identity controlling unit U4. The identity controlling unit U4 typically interacts with another entity, namely the user presence repository unit U3.

In the above implementation of access authorization, the step of determination of an access request may be initiated spontaneously by the user presence repository unit U3 but may also be solicited by the identity controlling unit U4 when the communication device enters its coverage area.

The identity controlling unit U4 may be connected to a mechanical gate that is opened in case of granted authorization and is closed in case of denied authorization and/or to an optical gate that optically signals the granted or denied authorization; alternatively or additionally, the identity controlling unit U4 may be connected to a telecommunication network e.g. for issuing fines or police calls in case of denied authorization.

Figure 3:
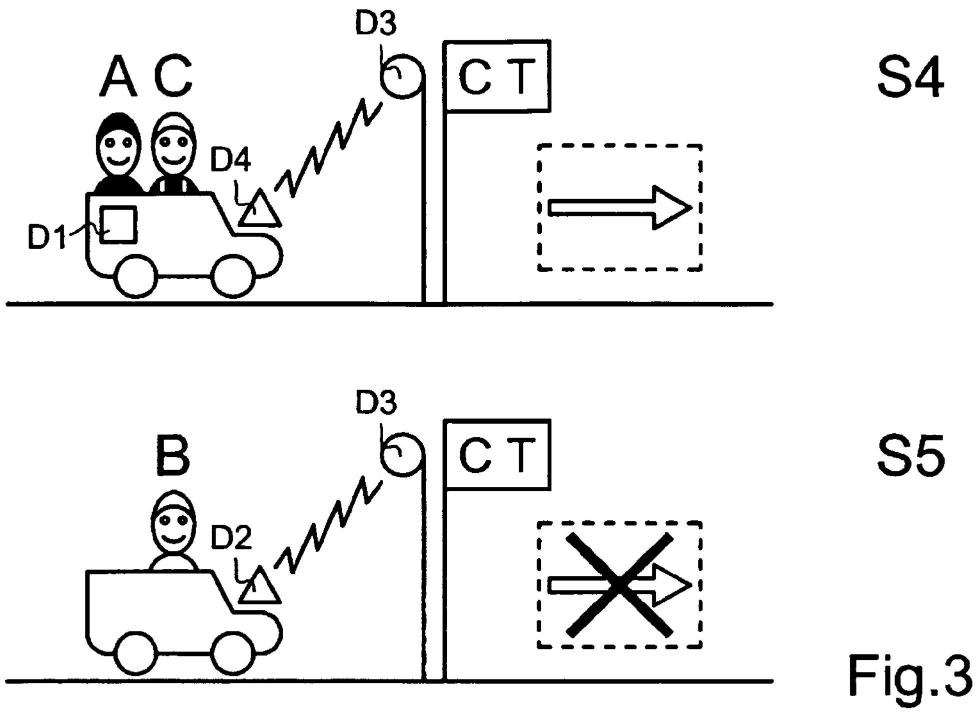
FIG. 3 shows a second set of situations used for explaining the present invention.
Figure 2:
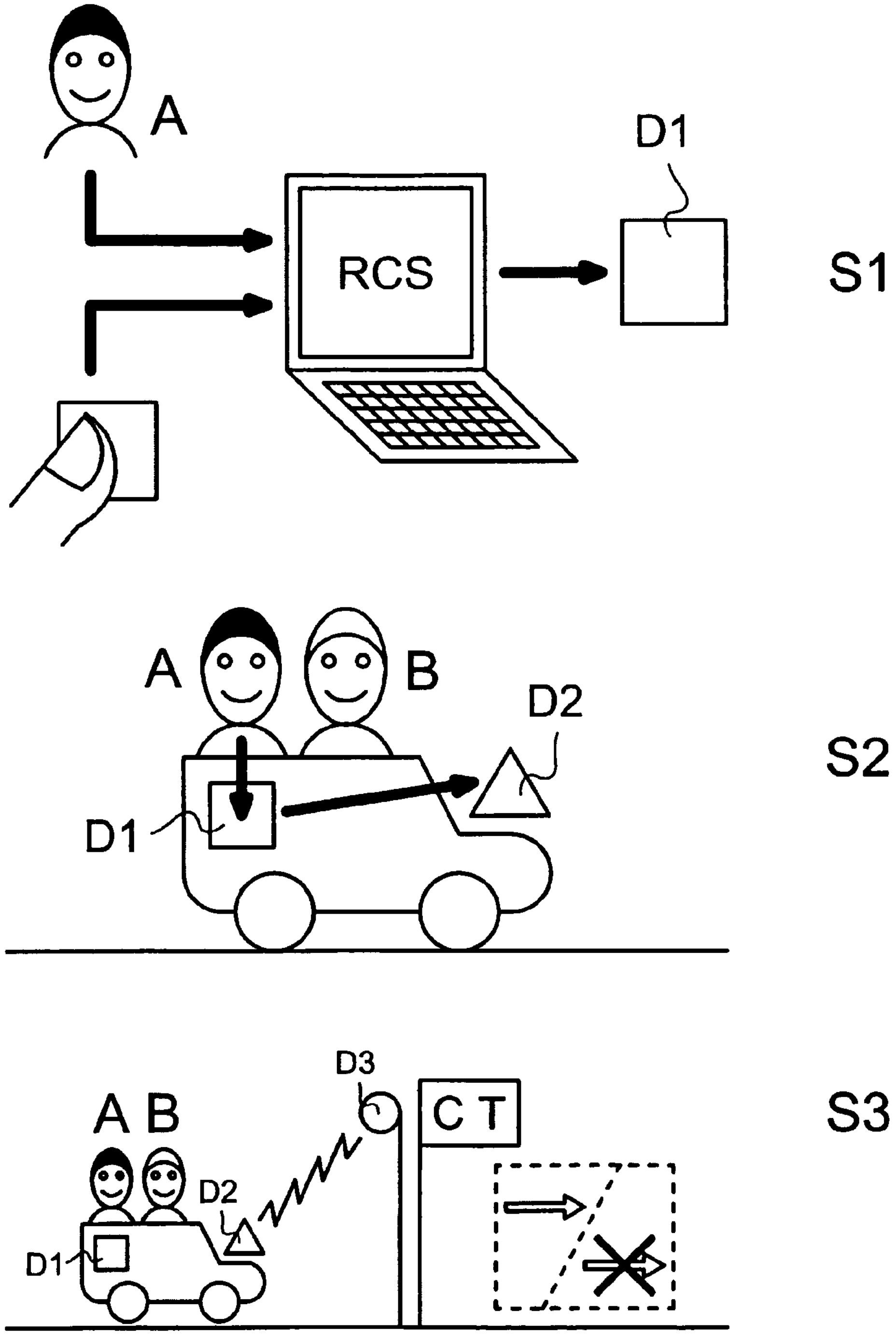
FIG. 2 shows a first set of situations used for explaining the present invention.

The operation of the above illustrated system in order to implement the access request communication based on biometric identity and its authorisation by the access controller is explained in greater detail in relation to FIGS. 2 and 3. These figures relate to the application of the present invention in authorising vehicles in limited traffic areas.

As shown in FIG. 2, user A is a person who can benefit of special rules to access limited traffic areas, while user B is another person who does not benefit of these special rules. User B has a car that has an electronic plate D2, e.g. a wirelessly communicating device as mentioned before, but this car is not allowed to access limited traffic areas.

To become a registered user (i.e. a person authorized to access limited traffic areas controlled by the electronic access control system according to the present invention), user A is required to visit a registration and configuration site RCS where he physically proves that he can benefit of special rules to access limited traffic areas, in particular city centre CT. User A is given a device D1 customized with his biometric data (typically detected at this site), for example by storing the biometric template (typically generated at this site) of one of his fingerprints. This operation is performed usually only once. All this corresponds to situation S1 in FIG. 2 where the customized user's device D1 is shown as a square at the output of the flow.

At a given moment when user A travels aboard the car of someone else, for example user B, (the presence of user B is not relevant for the application) and wishes to access a limited traffic area, such as a city centre CT, before accessing the city centre CT, user A authenticates himself using the user's device D1. The information about the presence of a people being a registered user on board is transferred (directly or indirectly) from the user's device D1 to the electronic plate D2 of the car and is stored therein. All this corresponds to situation S2 in FIG. 2 where the user's device D1 is shown as a square and car's electronic plate D2 is shown as a triangle.

When the car of user B accesses a city centre, for example city centre CT, one of the electronic gates D3 responsible for access control (shown in FIG. 2 as a circle on top of a pole) communicates with the electronic plate D2 of the car (shown in FIG. 2 as a triangle) and asks e.g. for the vehicle identity and information about the possible presence on board of people who benefit of special rules. The electronic plate D2 communicates the identity of the car and the presence on board of user A (namely his personal identity) that is a person authorized to access city centre CT. The electronic gate D3 elaborates this information and determines whether the car is allowed or not to transit based on the identity of the vehicle and/or any of its occupants. All this corresponds to situation S3 in FIG. 2.

The electronic gate D3 that acts as an access controller may be connected to a mechanical gate that is opened in case of granted authorization and is closed in case of denied authorization and/or to a traffic light (i.e. an optical gate) the colour of which (e.g. red or green) depends on the granted/denied access authorization and/or to a telecommunication network for issuing fines or police calls in case of denied authorization or for other purposes like traffic statistics. The electronic gate D3 sends typically a response to the electronic plate D2 informing it whether the access authorization is granted or denied.

The above response of the electronic gate D3 may be used in different ways for the benefit of the occupants of the car, in particular its driver and the registered user: (A) the electronic plate D2 of the car may issue a sound and/or a light and/or an image (i.e. direct notification), (B) a user's device may issue a sound and/or a light and/or an image (indirect notification); as it will be apparent from the following description the user's device may be embodied by different devices including e.g. a mobile phone that is perfectly fit for issuing sounds and/or lights and/or images.

In accordance with a further aspect, in order to value add to the secured access authorisation according to the present invention, any registered user is required to authenticate his biometric identity every time he wants to have access through a limited access area under the system of the invention. For this purpose, the personal identity information stored in the electronic plate D2 of the car of user B about the earlier presence of user A is not maintained permanently and is removed typically after transit through or under or, more in general, next to an electronic gate D3; to this regard, "next" means within the radiofrequency coverage area of the electronic gate D3.

A variety of different removal policies may be implemented: (A) single use of identity (removal occurs after each transit), (B) multiple use of identity (removal occurs after a predetermined number of transits), (C) time limit expiration use of identity (removal occurs after a time interval that is typically measured starting from the storage of the authenticated registered user into the electronic plate), (D) proximity approach; this last possibility means that the electronic plate stores the user identity at a certain time when the registered user authenticates and the electronic plates periodically checks whether the user's device is in the neighbourhood, if not (i.e. the registered user is out of the car) it removes the associated user identity.

Policy A or B may be combined with policy C or D. In fact, policies A and B are more oriented to avoid unauthorized reuse of the same authentication process while policies C and D are more oriented to guarantee the actual presence of a registered user next to the wirelessly communicating device (e.g. within a car) when it communicates with an electronic access controller.

The removal feature will be better understood with reference to FIG. 3; FIG. 3 shows other situations that occur after the situations of FIG. 2, i.e.

after the transit of the vehicle of user B next to one of the electronic gates D3 of city centre CT and after user A got out of the car of user B.

User C has the same characteristics of user B: he has a car not allowed to access the limited traffic area of city centre CT and the vehicle is equipped with an electronic plate D4, identical or similar to the electronic plate D2 of the car of user B. User A can access the city centre CT travelling on board the car of user C in the same way as in FIG. 2 (situation S3) provided user A authenticates again when on board the car of user C. All this corresponds to situation S4 in FIG. 3.

On the other hand, if user B tries now to access the city centre CT, the electronic gate D3 elaborates the information read from the electronic plate D2 of the car of user B and determines that the vehicle is not allowed to transit as user A is no longer on board the car of user B and his identity was removed from its electronic plate D2. All this corresponds to situation S5 in FIG. 3. Of course, if needed, user A can access city centre CT using the car of user B, but he has then to repeat the authentication operation (situation S2 of FIG. 2) in order to store a fresh request for authorisation with the electronic plate D2 of user B.

A request of access authorisation comprises information corresponding to one or more (typically only one) personal identities and/or information corresponding to one vehicle identity; other information may be present for communication purposes or for more complex functions.

Data collected by the access controller, such as an electronic gate, may be used for more complex operation and to build statistics about traffic and transits. Also, if needed, the electronic gate may be equipped with a physical gate and/or an optical gate.

Additionally, there may be more than one registered user associated to a common wirelessly communicating device (e.g. the electronic plate) or selectively to multiple wirelessly communicating devices which can interact with one or more electronic access controllers for desired access authorization based on biometric identity. It may be thus be possible that multiple users authenticate and store their request in the wirelessly communicating device in a short span of time so that all access requests can be determined and respective authorisations granted and recorded by the access controller.

Importantly also, there may be more than one biometric template associated to a registered user; for example two fingerprints of two different fingers or a fingerprint and a voiceprint; this could be useful for increasing safety or for more flexible authentication.

Figure 4:
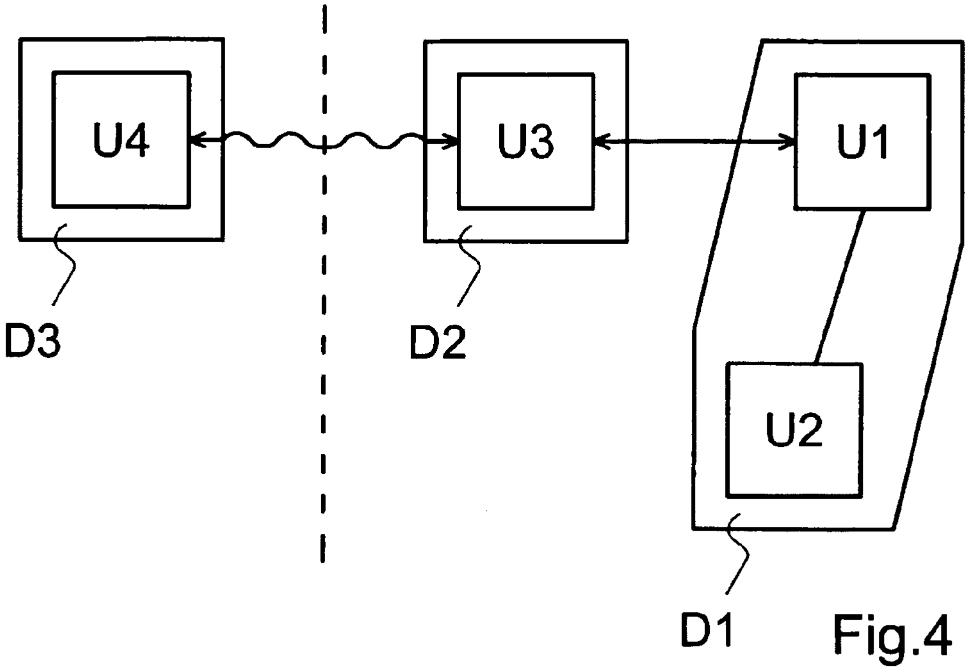
FIG. 4 shows the physical architecture of a first embodiment of the system for determining authorizations of access to a limited access area according to the present invention.

In accordance with a first embodiment of the present invention, as shown in FIG. 4, the biometric detection unit (U2) and the biometric template storage unit (U1) are realized in a single device such as an integrated fingerprint authentication device D1. The user presence repository unit (U3) is realized separately as a second device D2 and installed on the vehicle, preferably on the car windshield and not removably, that therefore operates like an electronic plate/tag of the vehicle. The communication between these devices D1 and D2 is realized in particular via a short-range wireless communication technology preferably through the secured and reliable ZigBee technology. It is important to notice that the electronic plate D2 may serve different applications for the car including access control checks based on vehicle information only like plate identity or pollution classification. This can be considered static data. Additionally, the electronic plate D2 can be used to store dynamic data like information about people on board the vehicle.

Now in relation to the specific embodiment of FIG. 4, the detailed operation is as follows.

At first a user wanting to have access to a limited access area via biometric recognition has to register to the service. In this case he receives an integrated biometric authentication device D1 with his fingerprint template stored in a non-volatile and secure location. Device D1 is able to communicate via ZigBee and this is preferably the communication technology used to configure it at the configuration site.

The car that the user wants to use has to be equipped with a wirelessly communicating device D2 (i.e. an electronic plate of the car) able to communicate via ZigBee with biometric device D1. When the user gets into the car he turns on or wakes up biometric device D1 and sweeps his finger in order to be detected and recognized. If the recognition process is successful (i.e. the user is the only registered user or one of the registered users) biometric device D1 attempts to establish a wireless link with communication device D2 (i.e. the electronic plate of the car) in order to store in it the information about the presence of a registered user on board; such information may be e.g. the identity of the registered user in an appropriate coded form. This communication is done via a secure communication channel by means e.g. of the ZigBee technology. If the recognition process failed nothing happens. Once the storage has been done, the communication channel is released and communication device D2 (i.e. the electronic plate of the car) is free to try to establish a communication link with other external devices, typically electronic access controllers. When the car approaches an external electronic access controller, such as an electronic gate D3, a wireless link is established between the electronic plate D2 and the electronic gate D3. Then the electronic gate D3 prompts the electronic plate D2 to communicate information about the vehicle identity and eventually information about registered user on board, in particular their personal identities. Finally, the electronic plate D2 communicates these data. Once the data are received by the electronic gate D3, it elaborates them and determines if the vehicle can access the limited access area or not based on the information relating to the vehicle and/or personal identities. In the second case, the vehicle identity is communicated to the public administration that can proceed to legal actions.

Also the communication between devices D2 and D3 is realized in particular via a short-range wireless communication technology preferably through the secured and reliable ZigBee technology.

It is also possible that the electronic gate D3 is provided with or associated to a physical gate like a bar or a door; in this case, the physical gate will be open only if the vehicle or the user on board are allowed to access the limited access area.

The information about the presence of the user on board the vehicle is removed after the transit of the vehicle in order to avoid reusing such presence information, especially when the user is no longer on board.

According to the embodiment of FIG. 4, the user presence information is automatically removed after every transit of the vehicle next to the electronic gate. In this case, if the user is still on board the same vehicle when transiting under a second electronic gate (of the same type of the first one or of a different type of the first one) he has to authenticate his presence again, sweeping his finger before transiting.

Another possibility (which can be in addition or in substitution to the preceding possibility) is to remove the user presence information on a time basis, for example after the expiration of a time limit; the expiration of the time limit may be signalled to the user by issuing a sound and/or a light. In this case, if the user is still on board the same vehicle after the expiration, he has to authenticate his presence again, sweeping his finger before transiting.

In both cases the operation required to the user is very simple and quick.

Figure 5:
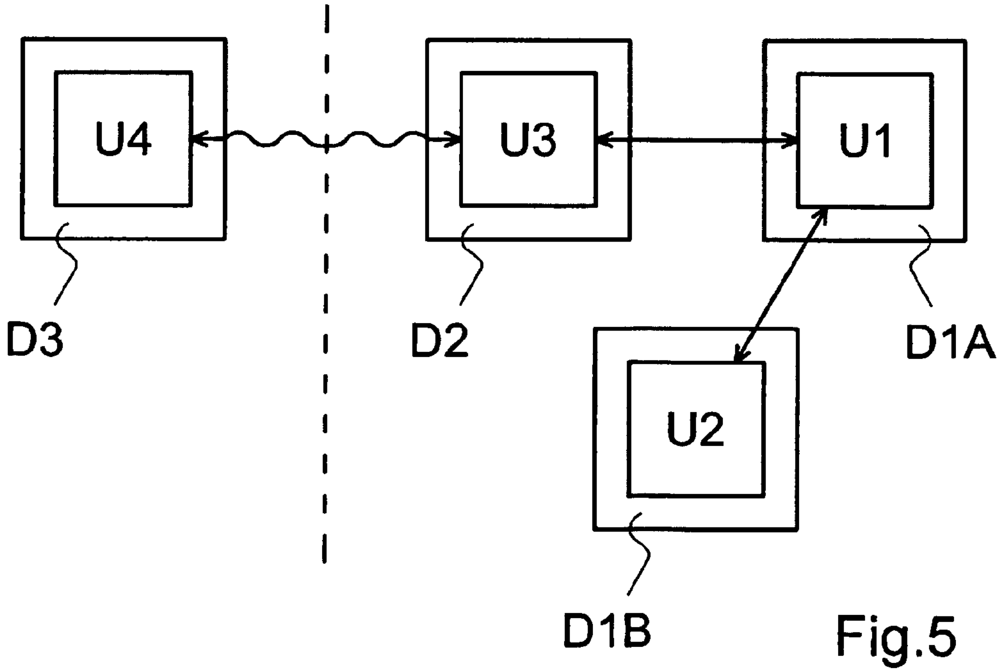
FIG. 5 shows the physical architecture of a second embodiment of system for determining authorizations of access to a limited access area according to the present invention and involving a mobile phone.

Another possible embodiment of the present invention is shown in FIG. 5. In this case, the biometric template of a registered user is stored in the SIM [Subscriber Identification Module] card, corresponding to the biometric template storage unit (U1), of a mobile phone D1A; the SIM card is a secure element inside the phone and can be used to store user sensitive data. The SIM card is a kind of "subscriber identity module" which is a general expression that covers SIM cards (of the GSM system) as well as USIM cards (of the UMTS system) and possibly other cards (of future mobile telephone systems).

The storage of biometric data in a subscriber identity module and the way of using them for authentication purposes is well described in WO2008/074342; according to this solution, the subscriber identity module (fitted within a user's terminal) and a biometric detecting device comprise a radio interface for communicating together and a module for exchanging biometric information between each other for authentication purposes.

In accordance with the second embodiment of the present invention, as shown in FIG. 5, the biometric detection unit (U2) and the biometric template storage unit (U1) are realized in separate devices; in particular, the biometric detection unit (U2) is realized as a biometric detecting device D1B. The user presence repository unit (U3) is still realized as a device D2 installed on the vehicle that therefore operates like an electronic plate/tag of the vehicle.

As in the previous case, the user has to register for the service and his biometric template is to be stored into the SIM card (U1). This must be done at the configuration site via e.g. ZigBee technology or another communication technology (for example through the pads of the card). It is advantageously provided that the card has a biometric template storage area and that writing into this area is allowed only to a configuration system available at the configuration site. At the configuration site, the user is also provided with a fingerprint detecting device able to communicate with the SIM card (U1) of the mobile phone (D1A).

The mobile phone D1A comprises a radiofrequency interface for communicating with mobile telephone networks and may comprise also one or more other communication interfaces, like InfraRed or Bluetooth or ZigBee, and may use them for communicating with the electronic plate D2 and/or the fingerprint detecting device D1B.

According to a typical application of the present invention, the SIM card (associated with the mobile phone D1A) integrates a ZigBee interface; such integrated ZigBee interface may be used for communicating with the electronic plate D2 and/or the fingerprint detecting device D1B.

Also according to the embodiment of FIG. 5, the car that the user wants to use has to be equipped with a wirelessly communicating device D2 (i.e. an electronic plate of the car) able to communicate via ZigBee; in this case, anyway, this device needs to communicate either with the mobile phone, i.e. device D1A, or with the associated SIM card (integrating a ZigBee interface). When the user gets into the car he turns on or wakes up both the biometric detecting device D1B and the mobile phone D1A. Then, he launches an application on the mobile phone D1A that creates a communication link between the SIM card of the mobile phone D1A and the fingerprint detecting device D1B. Once the communication link has been established, the biometric template is securely sent from the SIM card to the fingerprint detecting device D1B in order to allow the fingerprint recognition. Then the user sweeps his finger on the detector in order to be recognized. The fingerprint detecting device D1B communicates to the SIM card of the mobile phone DIA whether the recognition process was successful. If it was successful, the SIM card of the mobile phone D1A establishes a communication link with an electronic plate (D2 according to the example of FIG. 5) in order to store in it the information about the presence of an authenticated registered user on board. This communication is done via a secure communication channel by means e.g. of the ZigBee technology.

Once the storage has been done, the application flow proceeds as in the previous embodiment. The same applies to the removal of the information about the presence of the user. In this case, however, when this information is removed, a notification may be sent to the SIM card of the mobile phone DIA in order to notify the user that he has to authenticate again his presence aboard the car, if necessary.

It is to be noted that a mobile phone can comprise not only a biometric template storage unit (U1), as in the case of FIG. 5, but also a biometric detection unit (U2), for example a fingerprint detecting device.

The invention herein described is multi-user. This means that a single user may use the service on several cars provided that he has an appropriate biometric device and that every car is equipped with an appropriate electronic plate. Also a car may be used by several users, provided that the car has an appropriate electronic plate and every user has an appropriate biometric device.

An authentication protocol is preferably used to establish connection between the various devices involved in the application in order to allow communication only between trusted devices.

Figure 6:
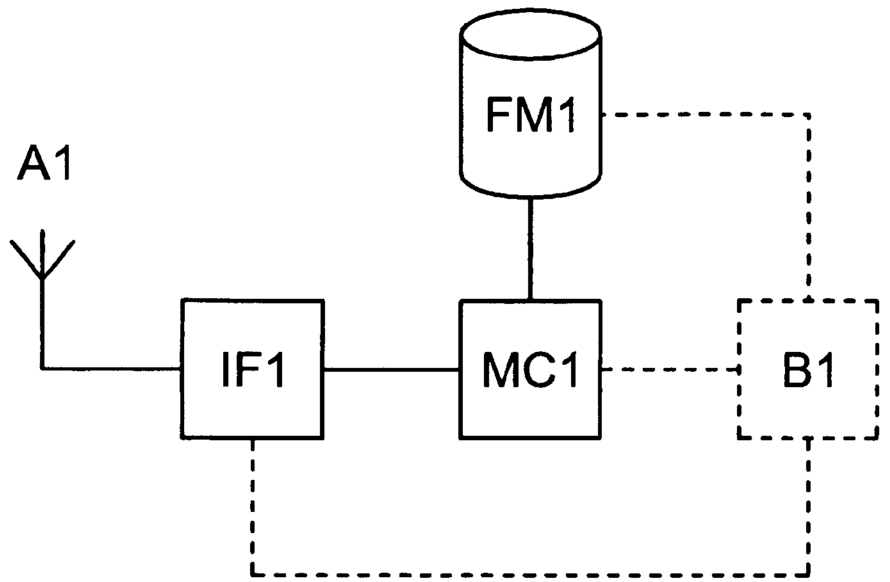
FIG. 6 is a block diagram of an electronic plate (wirelessly communicating device) that can used in the systems of FIG. 4 and FIG. 5.

The electronic plate described above can be realized as shown schematically in FIG. 6 . This device is self-supplied with a battery B1 in order to be easily installed on any vehicle. A microcontroller MC1 is responsible for all operations of the device; in particular, it controls all the communication operations through a radio interface IF1 and an antenna A1 with the other devices (i.e. the access controller, the fingerprint detecting device and the mobile phone); the microcontroller MC1 comprises appropriate memories for programs and data. A flash memory FM1 serves as user presence repository unit; this memory is shown as external to the microcontroller MC1 but could also be integrated therein. Storage and removal of user presence records is also managed by the microcontroller MC1.

Figure 7:
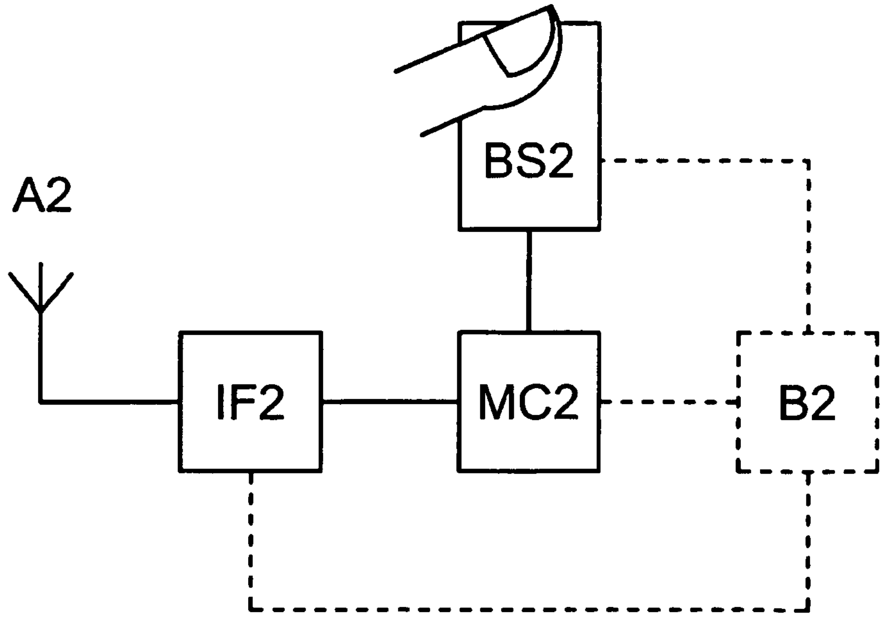
FIG. 7 is a block diagram of a fingerprint detecting device that can be used in the system of FIG. 5.

FIG. 7 shows schematically the architecture of a biometric fingerprint detecting device according to the invention. The device comprises three main blocks: a microcontroller MC2 (comprising appropriate memories for programs and data), a biometric sensor BS2 and a radio interface IF2 (connected to an antenna A2). The microcontroller MC2 is the main processing unit of the device and is in charge of any data processing to be carried out by the device (in particular biometric data and/or information processing). The biometric sensor BS2 is in charge of detecting and transmitting raw biometric data to the microcontroller MC2 that builds a fingerprint image, process it and generate a fingerprint template. The radio interface IF2 is in charge of allowing communication from the fingerprint detecting device to other devices and its behaviour is controlled by the microcontroller MC2. Depending on the chosen biometric sensor chipset and the chosen radio interface chipset the microcontroller MC2 may perform only the application logic and it can demand biometric data processing and communication protocols to these chipsets. The device is self-supplied by a battery B2.

It is apparent from the above description that the key aspect of the present invention resides in the biometric authentication which is based on a biometric recognition to prevent frauds.

The invention has been described with specific reference to fingerprint recognition since it is the most easy to carry it out; however, in principle, other techniques of biometric identity recognition, such as speaker recognition, can be equally applicable for the purposes of secure request generation for access authorisation and its determination under the present invention.

Any other authentication method, for instance the use of a PIN [Personal Identification Number] to be input into the wirelessly communicating device (for example the electronic plate/tag), may be used in addition to the mentioned biometric data.

The invention claimed is:

1. A method for communicating a request for authorization of access to a limited access area based on a personal identity of a registered user in a vehicle, comprising:

A) authenticating said personal identity of said registered user when desiring access to said limited access area, wherein authenticating said personal identity of said registered user comprises:

creating a communication link between a mobile phone of said registered user and a biometric detection device;

transmitting at least one pre-stored biometric template of said registered user from a subscriber identity module associated with said mobile phone to said biometric detection device; wherein said at least one pre-stored biometric template of said registered user is stored into said subscriber identity module associated with said mobile phone upon said registered user registers to have access to said limited access area;

detecting biometric data of said registered user at said biometric detection device;

comparing said at least one pre-stored biometric template to said detected biometric data; and transmitting to said mobile phone an indication of whether said comparison resulted in a match;

B) transferring said authenticated personal identity of said registered user from said mobile phone into a wireless communicating device upon receiving said indication, indicative of a presence of said registered user in said vehicle, wherein said wireless communicating device is an electronic plate said vehicle;

C) storing said authenticated personal identity of said registered user on said wireless communicating device as a valid request for authorization of access to said limited access area;

D) communicating said valid request for authorization of access through said wireless communicating device to an electronic access controller capable of being adapted to authorize access based on said valid request for authorization of access to said limited access area; and p1 E) removing said authenticated personal identity of said registered user from said wireless communicating device after a time interval starting from storing of said authenticated personal identity of said register user into said wireless communicating device.

2. The method of claim 1, wherein removing the stored authenticated personal identity of said registered user is carried out after at least one authorization of access.

3. The method of claim 1, wherein said detected biometric data and said at least one pre-stored biometric template are of the fingerprint type.

4. The method of claim 1, wherein transferring the authenticated personal identity of said registered user from said mobile phone into said wireless communicating device and/or communicating said valid request for authorization of access through said wireless communicating device to said electronic access controller is carried out by means of a short-range wireless technology.

5. The method of claim 1, wherein said valid request for authorization of access to said limited access area comprises said authenticated personal identity information and vehicle identity information.

6. A method for determining an authorization of access to a limited access area based on a personal identify of a registered user in a vehicle, comprising:

receiving a request for access authorization; and processing said request based on contained identity information by means of an electronic access controller, said request for access authorization being communicated by the method of claim 1.

7. The method of claim 6, wherein said electronic access controller interrogates the wireless communicating device in a neighbourhood of said electronic access controller in order to receive said request for access authorization.

8. The method of claim 6, wherein said electronic access controller replies to said request for access authorization containing said personal identity information of said registered user from said wireless communicating device by a grant or a deny of access and said wireless communicating device notifies said registered user and/or other users in said vehicle accordingly.

9. A system for communicating a request for authorization of access to a limited access area based on a personal identity of a registered user in a vehicle, comprising:

a biometric detection device in communication with a mobile device associated with said register user via a communication link for authenticating said personal identity of said registered user; wherein said biometric detection device is configured to receive at least one pre-stored biometric template of said registered user from a subscriber identity module associated with said mobile phone, detect biometric data of said registered user, compare said at least one pre-stored biometric template to said detected biometric data, and transmit to said mobile phone an indication of whether said comparison resulted in a match via said communication link;

a wireless communicating device capable of being adapted to communicate a valid request with an electronic access controller for authorization of access to said limited access area, wherein said wireless communicating device is an electronic plate of said vehicle, wherein said mobile device transfers said authenticated personal identity of said registered user from said mobile phone into said wireless communicating device upon receiving said indication, indicative of a presence of said registered user in said vehicle, wherein said authenticated personal identity of said registered user is stored into said wireless communicating device as said valid request for authorization of access to said limited access area, and wherein said wireless communicating device removes said authenticated personal identity of said registered user after a time interval starting from storing of said authenticated personal identity of said registered user into said wireless communicating device; and said mobile phone capable of being adapted to store said at least one pre-stored biometric template of said registered user into said subscriber identity module associated with said mobile phone upon said registered user registers to have access to said limited access area; and said electronic access controller capable of being adapted to authorize access based on said valid request for authorization of access to said limited access area.

10. A system for determining an authorization of access to a limited access area based on a personal identity of a registered user in a vehicle, comprising:

an electronic access controller capable of being adapted to authorize access to said registered user in said vehicle to said limited access area; and a system for communicating a request for authorization of access according to claim 9.

* * * * *